(12) United States Patent
Stasky

(10) Patent No.: US 10,828,962 B2
(45) Date of Patent: Nov. 10, 2020

(54) COMPACT COOLING SYSTEM FOR VEHICLE OPERATORS

(71) Applicant: Glenn Stasky, Rancho Cordova, CA (US)

(72) Inventor: Glenn Stasky, Rancho Cordova, CA (US)

(73) Assignee: Simpson Performance Products, Inc., Mooresville, NC (US)

( * ) Notice: Subject to any disclaimer, the term of this patent is extended or adjusted under 35 U.S.C. 154(b) by 124 days.

(21) Appl. No.: 16/034,952

(22) Filed: Jul. 13, 2018

(65) Prior Publication Data

US 2020/0016958 A1 Jan. 16, 2020

(51) Int. Cl.
*B60H 1/32* (2006.01)
*B60H 1/00* (2006.01)

(52) U.S. Cl.
CPC ....... *B60H 1/3208* (2013.01); *B60H 1/00271* (2013.01); *B60H 1/00592* (2013.01); *B60H 2001/3255* (2013.01)

(58) Field of Classification Search
CPC .... A41D 13/0053; A41D 13/005; A41D 1/00; A41D 1/002; B60H 1/3208; B60H 1/00592; B60H 1/00271; B60H 2001/3255; B60H 1/0025; B60H 2001/00307; B60H 1/32281; B60H 1/3226; A61B 5/6804
See application file for complete search history.

(56) References Cited

U.S. PATENT DOCUMENTS

| 3,566,143 | A | 2/1971 | Paine |
| 5,862,675 | A * | 1/1999 | Scaringe ............. A62B 17/005 |
| | | | 165/301 |
| 6,109,338 | A | 8/2000 | Butzer |
| 6,461,379 | B1 | 10/2002 | Carson |
| 6,510,696 | B2 | 1/2003 | Guttman |
| 6,915,641 | B2 | 7/2005 | Harvie |
| 6,957,697 | B2 | 10/2005 | Chambers |
| 7,000,682 | B2 | 2/2006 | Chambers |
| 2004/0159109 | A1 | 8/2004 | Harvie |
| 2005/0161193 | A1 | 7/2005 | Mckenzie |
| 2006/0027357 | A1 | 2/2006 | Mckenzie |
| 2008/0217419 | A1* | 9/2008 | Ehlers .................... G08B 21/20 |
| | | | 236/44 C |
| 2009/0308082 | A1 | 12/2009 | Monk |

(Continued)

FOREIGN PATENT DOCUMENTS

| CN | 2017-040504 | * | 1/2017 | ............. Y02B 30/72 |
| CN | 106363134 A | * | 1/2017 | ............. Y02B 30/72 |

*Primary Examiner* — Emmanuel E Duke
(74) *Attorney, Agent, or Firm* — Jim H. Salter; Inventive Law Inc.

(57) ABSTRACT

A compact cooling system for vehicle operators includes: a variable speed compressor; a radiator coupled to the compressor with a tube; a fan adjacent to the radiator; an expansion chamber coupled to the radiator with a tube; a cooling plate coupled to the expansion chamber with a tube; a fluid reservoir coupled to the cooling plate with a tube through which cooling fluid can be transferred; and a fluid pump coupled to the fluid reservoir with a tube, the cooling plate including an inlet port for receiving warm cooling fluid from a cooling garment and an outlet port for transferring chilled cooling fluid to the cooling garment via the fluid reservoir and the fluid pump.

19 Claims, 10 Drawing Sheets

(56) References Cited

U.S. PATENT DOCUMENTS

| | | |
|---|---|---|
| 2011/0169409 A1 | 7/2011 | Stasky |
| 2012/0227432 A1 | 9/2012 | Creech |
| 2013/0019611 A1 | 1/2013 | Sims |
| 2015/0237927 A1* | 8/2015 | Nelson .................... A47G 9/08 62/3.3 |
| 2017/0096048 A1* | 4/2017 | Larson ............... B60H 1/00785 |
| 2018/0334012 A1* | 11/2018 | Geller ................ B60H 1/00428 |

* cited by examiner

```
METHOD FOR PROVIDING COMPACT COOLING
       FOR VEHICLE OPERATORS
                -1000-
```

Provide a variable speed compressor.
-1010-

Couple a radiator to the compressor with a tube.
-1020-

Install a fan adjacent to the radiator.
-1030-

Couple an expansion chamber to the radiator with a tube.
-1040-

Couple a cooling plate to the expansion chamber with a tube.
-1050-

Couple a fluid reservoir to the cooling plate with a tube through which cooling fluid can be transferred.
-1060-

Couple a fluid pump to the fluid reservoir with a tube, the cooling plate including an inlet port for receiving warm cooling fluid from a cooling garment and an outlet port for transferring chilled cooling fluid to the cooling garment via the fluid reservoir and the fluid pump.
-1070-

Position thermal sensors proximately to the inlet port and the outlet port.
-1080-

Configure a controller in electrical connection with the compressor, the fan, and the fluid pump, the controller being configured to determine a temperature differential between the thermal sensors and to automatically control the operation of the compressor, the fan, and the fluid pump based on the temperature differential.
-1090-

End

FIG. 12

COMPACT COOLING SYSTEM FOR VEHICLE OPERATORS

TECHNICAL FIELD

The disclosed subject matter relates to the field of active cooling systems, human body temperature control systems, and particularly although not exclusively, to a compact cooling system for vehicle operators.

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the disclosure provided herein and to the drawings that form a part of this document: Copyright 2017-2018, Glenn Stasky; All Rights Reserved.

BACKGROUND

Temperature control for human beings can be a very valuable benefit. While the human body self-regulates body temperature as much as possible, human bodies are exposed to situations where self-regulation becomes difficult or impossible. In such situations, performance of tasks becomes less efficient, judgment can be impaired, and other adverse effects manifest. Thus, it may be valuable to devise a system which can allow a person to avoid the worst effects of extreme temperatures by assisting in regulation of body temperature.

Regulation of temperature in the torso of the body can provide much benefit to a person experiencing temperature extremes. One example of a situation that can cause temperature extremes is a race (e.g., a motorcycle or automobile race) set in an extreme temperature environment. Past attempts to provide a system for controlling body temperature have focused on overheating and attempts to cool a driver or other vehicle operators.

Traditional race car cooling systems rely on ice cubes or blocks in a small ice chest. Chilled water is circulated through a shirt with many feet of small tubing sewn inside. As the ice melts, the cool water is pumped through the shirt. However, the cooling effect only lasts a short time. Some other conventional cooling systems use an inefficient thermo/electric cooling device called a Peltier device. A conventional Peltier cooler, heater, or thermoelectric heat pump is a solid-state active heat pump, which transfers heat from one side of the device to the other, with the consumption of electrical energy, depending on the direction of the current. However, Peltier coolers are very inefficient and use too much electricity to be effective. Other conventional cooling systems use a compressed gas in a can. Cooling is achieved by spraying cold air into a tube. However, the cooling effect with these devices lasts only a few minutes.

The conventional active cooling systems are too heavy, too bulky, inefficient, consume too much power, and are effective for only a limited amount of time. Thus, a better active cooling system for vehicle operators is needed.

SUMMARY

In the various example embodiments disclosed herein, a compact human cooling system comprises a miniature refrigeration unit, water pump, thermo-feedback circuitry and a garment with capillary tubes sewn in to provide direct cooling to the body of a wearer. The various example embodiments can efficiently cool a human body while working in a warm environment, such as a race car, summer heat, motorcycle operation, fire-fighting operation, or any situation where the human body needs to be cooled. An example embodiment can include a smart temperature sensing device, which can monitor the cooling needs of the user by use of multiple thermo-sensors (temperature sensors). The smart thermo-control (temperature control) features of the example embodiments save power and optimize temperature efficiency. The example embodiments can use minimal electricity from any 12 volt electrical power source, such as a battery, vehicle, or motorcycle. The various example embodiments disclosed herein can provide continuous cooling with efficient usage of electrical power. Because of the specialized miniature compressor/condenser system of the various example embodiments disclosed herein, the disclosed system can provide cooling efficiency six to eight times better than a conventional Peltier system. Example embodiments can provide direct chilling via a gas to liquid exchanger, a very small variable speed rotary compressor, a variable speed water or cooling fluid pump, and a controller to monitor and actively maintain a pre-set temperature within the cooling fluid. As a result, the disclosed compact cooling system provides human body temperature control with high efficiency and very low power usage. Additionally, the compact design can be used in more places while saving space.

The various example embodiments disclosed herein can provide several features and benefits including, inter alia: 1) a very small and compact design, 2) reliability, 3) high efficiency, 4) impact and fire resistance, 5) continuous operation even for a 24-hour period, 6) the current temperature of the cooling fluid can be transmitted in real time via radio to a remote location (e.g., to team manager during a race), 7) the disclosed system can achieve and sustain much colder temperatures than ice alone, 8) the disclosed system can chill water as low as 35 degrees Fahrenheit, 9) the disclosed system can be used for a multitude of applications, such as motorcycle operation and racing, vehicle operation and racing, medical personnel support, fire-fighter personnel support, industrial applications, military personnel support, and the like. Example embodiments are described in more detail below.

BRIEF DESCRIPTION OF THE DRAWINGS

Embodiments are illustrated by way of example and not limitation in the figures of the accompanying drawings, in which:

FIG. 12 illustrates a flow diagram representing a sequence of operations performed in a method according to an example embodiment.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

In the various example embodiments described herein, a compact cooling system for vehicle operators is disclosed. In an example embodiment, a compact human cooling system comprises a miniature refrigeration unit, water pump, thermo-feedback circuitry and a garment with capillary tubes sewn in to provide direct cooling to the body of a wearer. The various example embodiments can efficiently cool a human body while working in a warm environment, such as a race car, summer heat, motorcycle operation, fire-fighting operation, or any situation where the human body needs to be cooled. An example embodiment can include a smart temperature sensing device, which can monitor the cooling needs of the user by use of multiple thermo-sensors (temperature sensors). The smart thermo-control (temperature control) features of the example embodiments save power and optimize temperature efficiency. The example embodiments can use minimal electricity from any 12 volt electrical power source, such as a battery, vehicle, or motorcycle. The various example embodiments disclosed herein can provide continuous cooling with efficient usage of electrical power. Because of the specialized miniature compressor/condenser system of the various example embodiments disclosed herein, the disclosed system can provide cooling efficiency six to eight times better than a conventional Peltier system. Example embodiments can provide direct chilling via a gas to liquid exchanger, a very small variable speed rotary compressor, a variable speed water or cooling fluid pump, and a controller to monitor and actively maintain a pre-set temperature within the cooling fluid. As a result, the disclosed compact cooling system provides human body temperature control with high efficiency and very low power usage. Additionally, the compact design can be used in more places while saving space.

Figure 1:
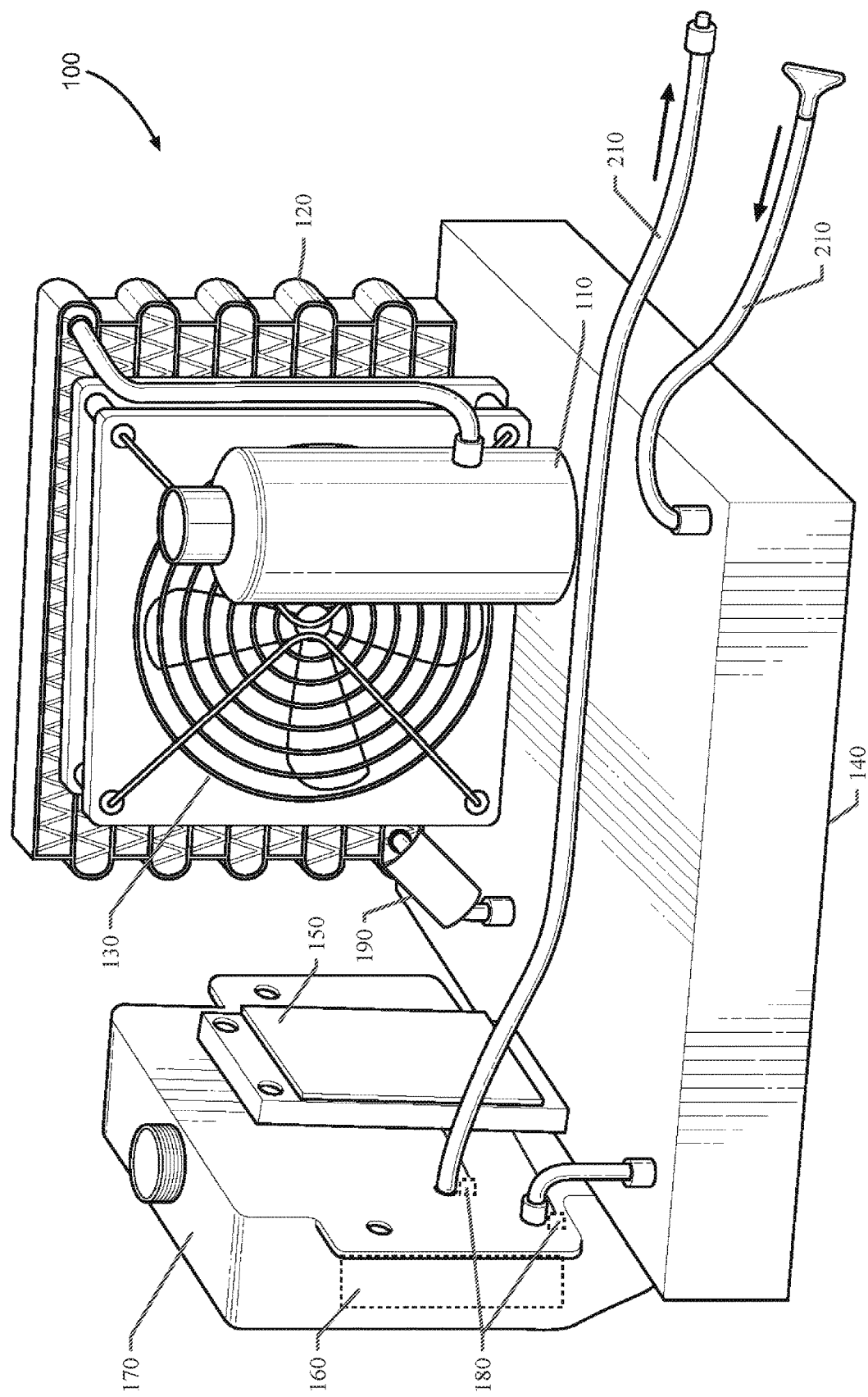
FIG. 1 illustrates an example embodiment of the components of the compact cooling system for vehicle operators.

FIG. 1 illustrates an example embodiment of the components of the compact cooling system 100 for vehicle operators. Referring now to FIG. 1 in an example embodiment, the compact cooling system for vehicle operators 100 of an example embodiment comprises a variable speed compressor 110 coupled to a radiator 120 with a tube or piping through which refrigerant can be transferred from the compressor 110 to the radiator 120 and circulated within the radiator 120. In an example embodiment, the compressor 110 can be of a small dimension to enable the compact cooling system 100 to be built in a small form factor. In an example embodiment, the compressor 110 dimensions can be 130 millimeters tall and 75 millimeters wide. In other embodiments, a smaller or larger compressor 110 can also be used.

A variable speed fan 130 is positioned adjacent and proximately to the radiator 120 to force air through the radiator 120 to draw heat from the refrigerant circulating through the radiator 120. As described in more detail below, a controller 150 is connected to the variable speed compressor 110 and the variable speed fan 130. The controller 150 is configured to automatically adjust the operation of the compact cooling system 100 by controlling at least the operation of the variable speed compressor 110 and the variable speed fan 130. A fluid reservoir 170 is provided to store and source cooling fluid for circulation through the compact cooling system 100 and a cooling garment 200. A fluid pump 160 is provided to cause the cooling fluid to circulate through the compact cooling system 100 and the cooling garment 200. In a particular embodiment, the fluid pump 160 can be installed and operated from within the fluid reservoir 170. The fluid pump 160 is also controlled by the controller 150 as described in more detail below. The compact cooling system 100 of an example embodiment also includes a cooling plate or evaporator 140. The cooling plate 140 can be coupled to the radiator 120 via an expansion chamber 190. The cooling plate 140 can also be coupled to the fluid reservoir 170 and indirectly to the fluid pump 160 with a tube through which cooling fluid can be transferred. The cooling plate 140 can be configured with an inlet port for receiving warm cooling fluid from the cooling garment 200 and an outlet port for transferring chilled cooling fluid to the cooling garment 200 via the fluid reservoir 170 and the fluid pump 160. As described in more detail below, the chilled cooling fluid produced by the compact cooling system 100 can be transferred to and circulated within the cooling garment 200, such as a cooling shirt. The chilled cooling fluid serves to lower the body temperature of the wearer of the cooling garment 200. Warm cooling fluid can be transferred from the cooling garment 200 and back into the compact cooling system 100 where the cooling fluid is chilled and recirculated again.

FIG. 1 also illustrates a set of thermal sensors or temperature feedback sensors 180. In an example embodiment, the thermal sensors 180 can be installed on or adjacent to the cooling fluid tubes 210, which can be coupled to the cooling plate 140, the fluid pump 160, and the fluid reservoir 170. The thermal sensors 180 can also be installed on or adjacent to the inlet port and outlet port of the cooling plate 140. The thermal sensors 180 can be implemented as standard negative Temperature Coefficient (NTC) thermistors, Resistance Temperature Detector (RTD) devices, thermocouples, semiconductor-based sensors, or the like. The thermal sensors 180 are configured to sense the temperature of the cooling fluid within each of the cooling fluid tubes 210. In particular, one of the thermal sensors 180 is configured to sense the temperature of the chilled cooling fluid within the cooling fluid tube 210 being transferred to the cooling garment 200. The other thermal sensor 180 is configured to sense the temperature of the warmed cooling fluid within the cooling fluid tube 210 being transferred from the cooling garment 200. As described in more detail below, the controller 150 is configured to determine the differential, difference, or delta between the temperature of the chilled cooling fluid being transferred to the cooling garment 200 and the temperature of the warmed cooling fluid being transferred from the cooling garment 200. This temperature delta represents a value, which can be used by the controller 150 to automatically throttle the output of the compact cooling system 100 as described in more detail below.

An example embodiment of the compact cooling system 100 serves as a liquid cooling system that uses a cooling fluid, such as water, distilled water, alcohol, coolant, refrigerant, a water-based coolant, and oil-based coolant, or other cooling fluid with a high specific heat capacity, density, and thermal conductivity. A liquid cooling system is particularly beneficial for cooling a human body because the cooling fluid can be circulated in close proximity to body surfaces and can thereby provide focused heat transfer, which is especially useful for applications where multiple heat sources generate significant heat and need to operate below ambient temperatures. The liquid cooling system of the disclosed embodiments is also beneficial because the system can be flexibly designed with a relatively small form factor. In particular, the compact cooling system 100 of example embodiments can be configured in a form factor suitable for installation on a motorcycle or in a race vehicle.

Figure 2:
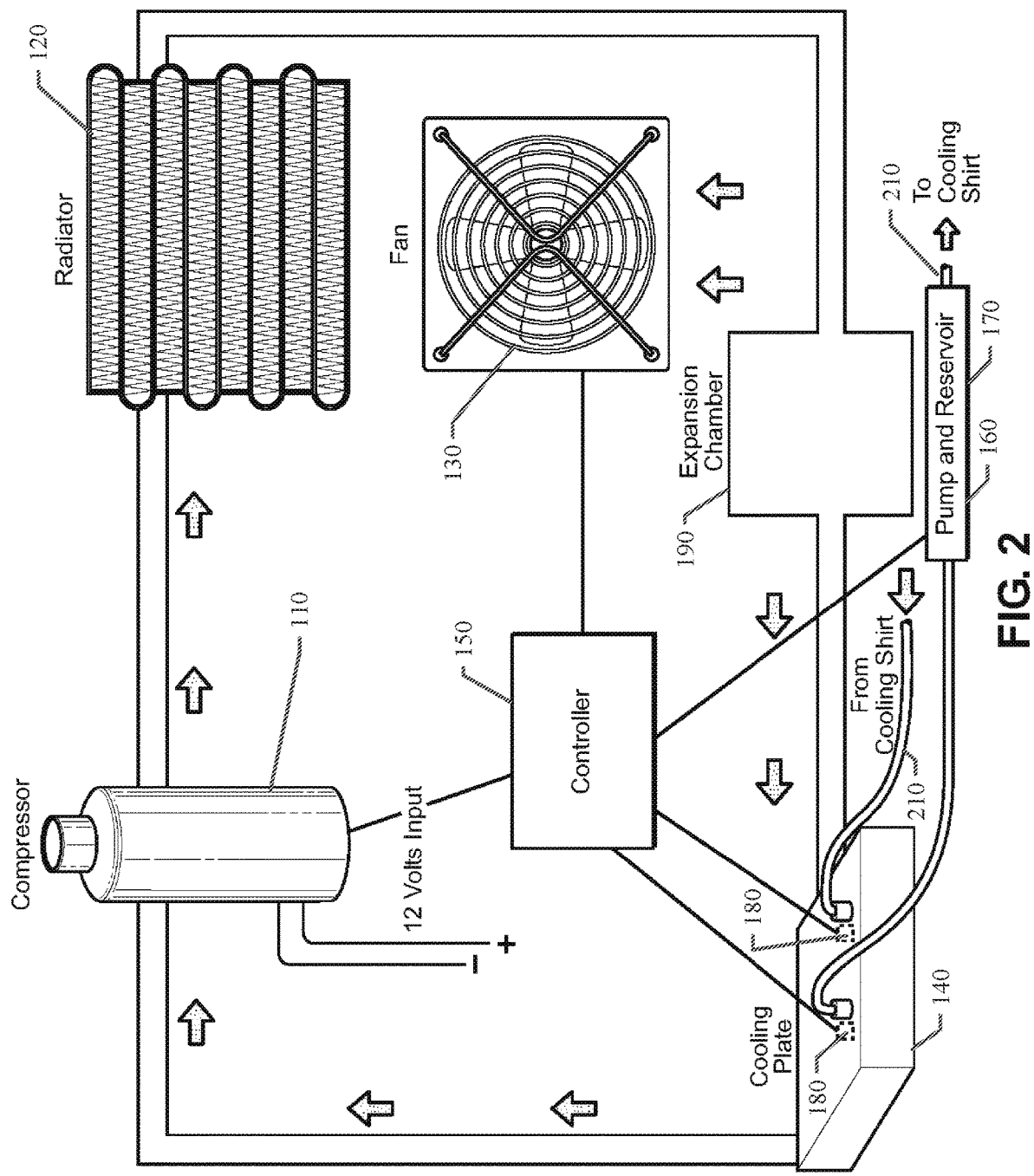
FIG. 2 illustrates a schematic of an example embodiment of the compact cooling system showing the flow of cooling fluid through the system.

FIG. 2 illustrates a schematic of an example embodiment of the compact cooling system 100 showing the flow of refrigerant and cooling fluid through the system. In general, the compact cooling system 100 of the example embodiments includes four basic components: a compressor 110, a radiator or condenser 120, an expansion chamber 190, and a cooling plate or evaporator 140. In a liquid cooling system, the cooling plate/evaporator 140 is typically configured as a compact refrigerant-to-cooling fluid heat exchanger in which the refrigerant absorbs heat from the cooling fluid. A fluid pump 160 is used to circulate the cooling fluid through the compact cooling system 100 and tubing or piping is used to connect the cooling plate 140 to the cooling garment 200 where the cooling plate 140 absorbs heat from the cooling garment 200. The expansion chamber 190 is the component that controls the expansion of the refrigerant or compressed gas coming out of the compressor 110. When the gas expands, it creates a heat conversion that makes the gas cold. The compact cooling system 100 pumps the chilled gas into the cooling plate 140 where it removes heat from the cooling fluid received from the cooling garment 200. The expansion chamber 190 allows high pressure and heated refrigerant to expand and change from liquid to gas. In this process, heat is transferred and the expanding gas sheds heat. This chilled gas is then pumped to the cooling plate 140, which exchanges heat from the incoming warmed cooling fluid received from the cooling garment 200. The latent heat of vaporization principle makes this process possible. In conventional air conditioning systems, an evaporator is used. Instead of an air to air interface, the compact cooling system 100 uses a gas to fluid interface yielding a much higher efficiency. In the various embodiments described herein, the compact cooling system 100 does not employ a traditional "evaporator". Instead, a more direct cooling plate 140 is used to increase cooling efficiency. This allows for a more efficient transfer of heat from the cooling fluid received from the cooling garment 200.

Figure 3:
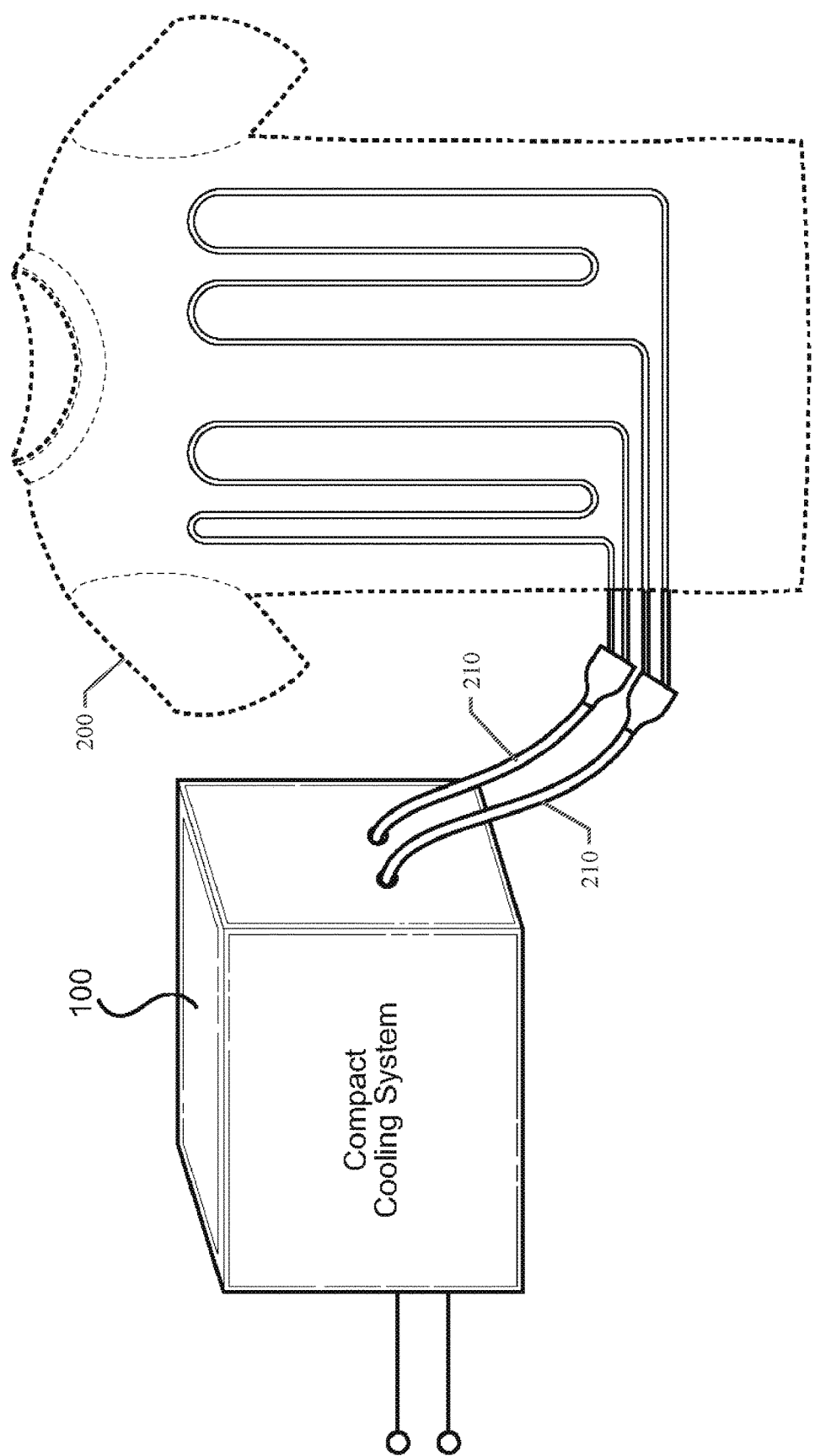
FIG. 3 illustrates an example embodiment of the compact cooling system for vehicle operators as attached to a cooling garment worn by a user.

FIG. 3 illustrates an example embodiment of the compact cooling system 100 for vehicle operators as attached to a cooling garment 200 worn by a user. As shown, the compact cooling system 100 can provide two cooling fluid tubes or pipes 210, which can be attached to a cooling garment 200. Cooling garments 200, such as shirts or pants, with sewn-in tubes for the transfer of cooling fluid in a serpentine path across or adjacently to the body of a wearer, are well-known in the art. One of the cooling fluid tubes or pipes 210 can be a supply line that provides chilled cooling fluid to an input port of the cooling garment 200. The other of the cooling fluid tubes or pipes 210 can be a return line that returns warmed cooling fluid to the compact cooling system 100. As shown in FIG. 2, the supply line cooling fluid tube 210 can be coupled to the fluid pump 160 and fluid reservoir 170, which is coupled to the cooling plate 140. The return line cooling fluid tube 210 can be coupled to the cooling plate 140, which uses the other components of the compact cooling system 100 described above to remove heat from the cooling fluid and produce a chilled cooling fluid for recirculation back into the cooling garment 200.

Figure 4:
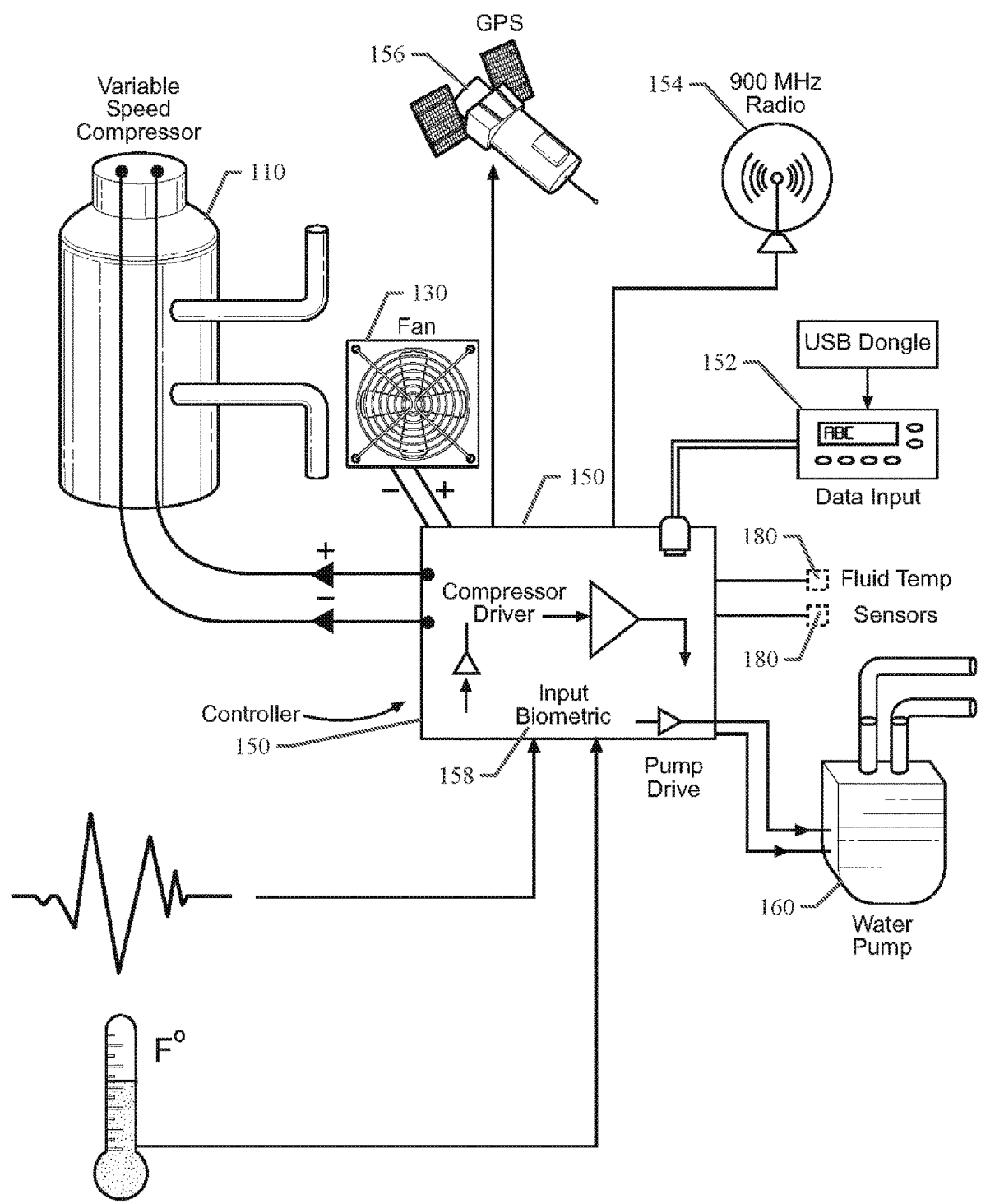
FIG. 4 illustrates a schematic of another example embodiment of the compact cooling system highlighting the controller and the controller interfaces.

FIG. 4 illustrates a schematic of another example embodiment of the compact cooling system 100 highlighting the controller 150 and the controller interfaces. As described above, the controller 150 is configured to use the thermal sensors 180 to determine the differential, difference, or delta between the temperature of the chilled cooling fluid being transferred to the cooling garment 200 on the supply line and the temperature of the warmed cooling fluid being transferred from the cooling garment 200 on the return line. This temperature delta represents a value, which can be used by the controller 150 to automatically throttle the output of the compact cooling system 100. Because the compressor 110 in an example embodiment is a variable speed compressor, the controller 150 can automatically adjust a compressor driver to reduce the output of the compressor 110 when the temperature delta is small. Conversely, the controller 150 can automatically adjust the compressor driver to increase the output of the compressor 110 when the temperature delta is large. The controller 150 is electrically coupled to the compressor 110 for this purpose as shown in FIG. 4. Similarly, the controller 150 is electrically coupled to the fan 130. Because the fan 130 in an example embodiment can be a variable speed fan, the controller 150 can automatically adjust a fan driver to reduce the output of the fan 130 when the temperature delta is small. Conversely, the controller 150 can automatically adjust the fan driver to increase the output of the fan 130 when the temperature delta is large. As a result, the compact cooling system 100 of an example embodiment can automatically adjust for the cooling needs of the wearer of the cooling garment 200. As shown in FIG. 2, the controller 150 can also be electrically coupled to the fluid pump 160. Because the fluid pump 160 in an example embodiment can be a variable speed pump, the controller 150 can automatically adjust a pump driver to reduce the output of the fluid pump 160 when the temperature delta is small. Conversely, the controller 150 can automatically adjust the pump driver to increase the output of the fluid pump 160 when the temperature delta is large. As a result, the compact cooling system 100 of an example embodiment can automatically adjust for the cooling needs of the wearer of the cooling garment 200.

In another example embodiment, the controller 150 can include a biometric interface 158, which can receive biometric data from the wearer of the cooling garment 200. In particular, the controller 150 can receive biometric data from the wearer including heart or pulse rate, temperature, blood $O^2$ levels, Electroencephalography (EEG) data, Magnetoencephalography (MEG) data, or the like. In a manner similar to the use of the temperature delta value as described above, the controller 150 can receive the biometric data from the wearer of the cooling garment 200 via biometric interface 158 and use the biometric data to automatically throttle the output of the compact cooling system 100.

In an example embodiment shown in FIG. 4, the controller 150 can include a data interface 152, which can be used by a user to program or configure the operation of the controller 150 and the compact cooling system 100. The data interface 152 can be used by a user to input parameters or selections to configure the operation of the compact cooling system 100. A USB dongle interface can also be provided to enable the bulk transfer of large amounts of data or parameter configurations. An example embodiment can also provide a radio interface 154 and a global positioning system (GPS) interface 156. The radio interface 154 can be used by the controller 150 to establish a wireless data communication connection with a remote receiver to transfer telemetry data to the receiver including temperature or biometric data of the wearer of the cooling garment 200 in real time. The wireless data connection can also be used to transmit status data representing the real time condition of the compact cooling system 100. The radio interface 154 can also be used by the controller 150 to wirelessly receive commands or parameters from a remote transmitter, which can be used by the controller 150 to modify the operation of the compact cooling system 100 in real time. The GPS interface 156 can be used by the controller 150 to determine an accurate geographical location of the compact cooling system 100 or to receive geographical location data in real time. The geographical location can also be reported to the remote receiver via the radio interface 154. One aspect of an example embodiment is the utilization of GPS data to predict and monitor "virtual" lap times on a race course. An example embodiment of the compact cooling system 100 as disclosed herein can be used for automatic monitoring of driver performance relative to the lap times determined using the GPS data. In particular, the biometric data of a wearer of the cooling garment 200 (e.g., a vehicle driver/racer) can be monitored by the controller 150 and associated with the lap times determined using the GPS data. The controller 150 can be configured to automatically modify the cooling level (e.g., increase or decrease cooling output) of the wearer/driver based on the lap times determined using the GPS data. As such, example embodiments can be configured to use biometric inputs of a driver and the GPS lap times to support race teams.

Figure 5:
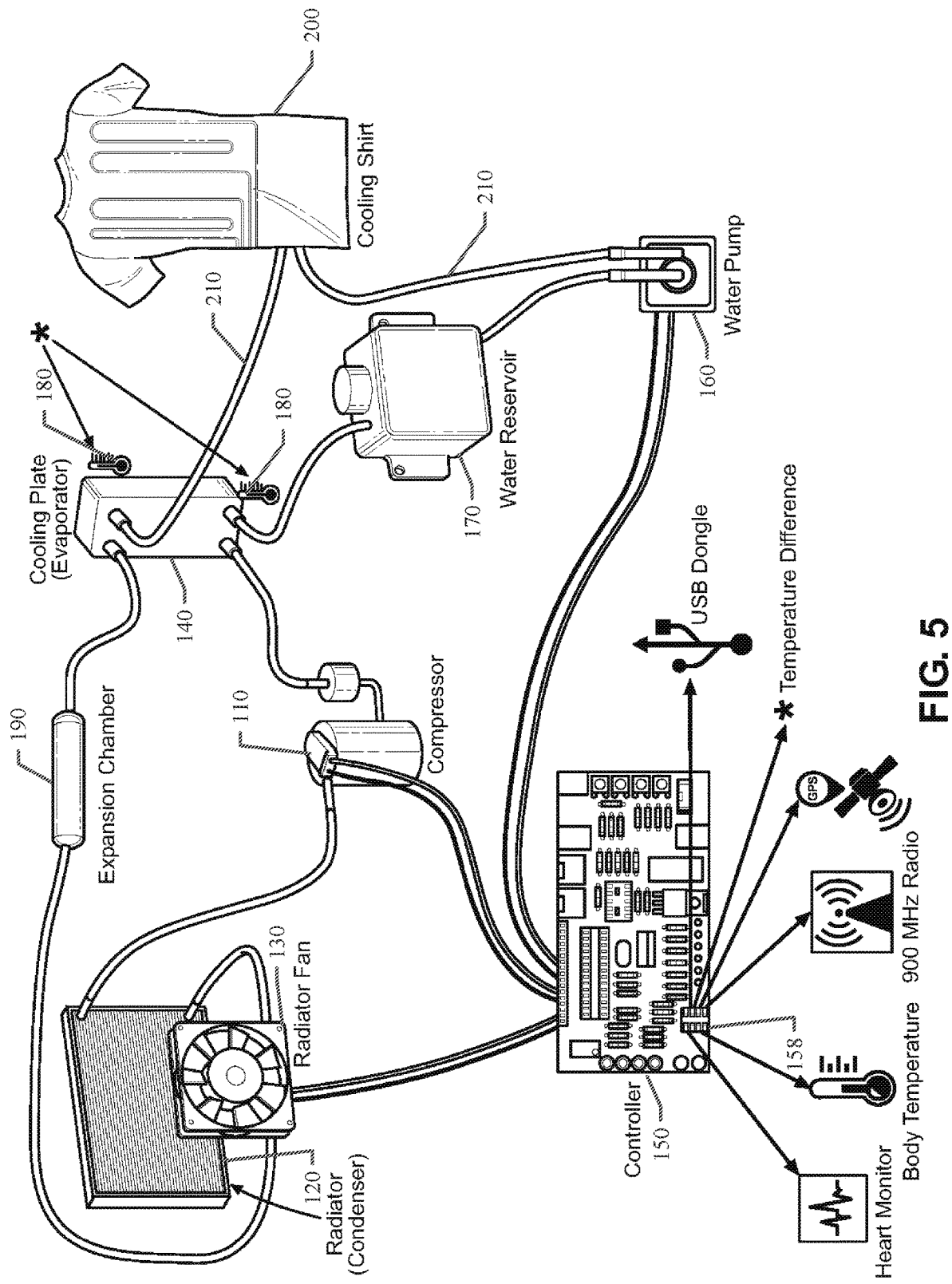
FIG. 5 illustrates another example embodiment of the components of the compact cooling system for vehicle operators.

FIG. 5 illustrates another example embodiment of the components of the compact cooling system 100 for vehicle operators. As shown in FIG. 5 for an example embodiment, the compact cooling system 100 can include a variable speed compressor 110 coupled to a radiator 120 with a tube or piping through which refrigerant can be transferred from the compressor 110 to the radiator 120 and circulated within the radiator 120. A variable speed fan 130 is positioned adjacent and proximately to the radiator 120 to force air through the radiator 120 to draw heat from the refrigerant circulating through the radiator 120. The controller 150 is connected to the variable speed compressor 110 and the variable speed fan 130 to throttle the operation of these components as described above. As such, the controller 150 is configured to automatically adjust the operation of the compact cooling system 100 by controlling at least the operation of the variable speed compressor 110 and the variable speed fan 130. A fluid reservoir 170 is provided to store and source the cooling fluid for the circulation through the compact cooling system 100. A fluid pump 160 is provided to cause the cooling fluid to circulate through the compact cooling system 100. In a particular embodiment, the fluid pump 160 can be installed and operated from within the fluid reservoir 170. The fluid pump 160 is also controlled by the controller 150 as described above. The compact cooling system 100 of an example embodiment also includes a cooling plate or evaporator 140. The cooling plate 140 is coupled to the fluid reservoir 170, which is coupled to the fluid pump 160, with a tube or piping through which cooling fluid can be transferred. As described herein, the chilled cooling fluid produced by the compact cooling system 100 can be transferred to and circulated within the cooling garment 200, such as a cooling shirt. The chilled cooling fluid serves to lower the body temperature of the wearer of the cooling garment 200. Warm cooling fluid can be transferred from the cooling garment 200 and back into the compact cooling system 100 where the cooling fluid is chilled and recirculated again.

FIG. 5 also illustrates the expansion chamber 190 of an example embodiment. The expansion chamber 190 is the component that controls the expansion of the refrigerant or compressed gas coming out of the compressor 110. When the gas expands, it creates a heat conversion that makes the gas cold. The compact cooling system 100 pumps the chilled gas into the cooling plate 140 where it removes heat from the cooling fluid received from the cooling garment 200. The expansion chamber 190 allows high pressure and heated refrigerant to expand and change from liquid to gas. In this process, heat is transferred and the expanding gas sheds heat. This chilled gas is then pumped to the cooling plate 140, which exchanges heat from the incoming warmed cooling fluid received from the cooling garment 200.

FIG. 5 also illustrates the set of thermal sensors or temperature feedback sensors 180. In an example embodiment, the thermal sensors 180 can be installed on or adjacent to the cooling fluid tubes 210, which can be coupled to the cooling plate 140, the fluid pump 160, and the fluid reservoir 170. The thermal sensors 180 can also be installed on or adjacent to the inlet port and outlet port of the cooling plate 140. In other embodiments, one of the thermal sensors 180 can be installed on or adjacent to the cooling fluid tube attached to the water reservoir 170. The thermal sensors 180 are configured to sense the temperature of the cooling fluid within each of the cooling fluid tubes 210. In particular, one of the thermal sensors 180 is configured to sense the temperature of the chilled cooling fluid within the cooling fluid tube being transferred to the cooling garment 200. The other thermal sensor 180 is configured to sense the temperature of the warmed cooling fluid within the cooling fluid tube 210 being transferred from the cooling garment 200. As described above, the controller 150 is configured to determine the differential, difference, or delta between the temperature of the chilled cooling fluid being transferred to the cooling garment 200 and the temperature of the warmed cooling fluid being transferred from the cooling garment 200. This temperature delta represents a value, which can be used by the controller 150 to automatically throttle the output of the compact cooling system 100 as described above.

FIG. 5 also illustrates the controller 150 and the controller interfaces. As described above, the controller 150 is configured to use the thermal sensors 180 to determine the differential, difference, or delta between the temperature of the chilled cooling fluid being transferred to the cooling garment 200 on the supply line and the temperature of the warmed cooling fluid being transferred from the cooling garment 200 on the return line. This temperature delta represents a value, which can be used by the controller 150 to automatically throttle the output of the compact cooling system 100. As described above, the controller 150 can automatically adjust a compressor driver to reduce the output of the compressor 110 when the temperature delta is small or automatically adjust the compressor driver to increase the output of the compressor 110 when the temperature delta is large. Similarly, the controller 150 can automatically adjust a fan driver to reduce the output of the fan 130 when the temperature delta is small or automatically adjust the fan driver to increase the output of the fan 130 when the temperature delta is large. Additionally, the controller 150 can automatically adjust a pump driver to reduce the output of the fluid pump 160 when the temperature delta is small or automatically adjust the pump driver to increase the output of the fluid pump 160 when the temperature delta is large. As a result, the compact cooling system 100 of an example embodiment can automatically adjust for the cooling needs of the wearer of the cooling garment 200.

As shown in FIG. 5, the controller 150 can include a biometric interface 158, which can receive biometric data from the wearer of the cooling garment 200. The controller 150 can receive the biometric data from the wearer of the cooling garment 200 via biometric interface 158 and use the biometric data to automatically throttle the output of the compact cooling system 100. In the example embodiment shown in FIG. 5, the controller 150 can include a data interface, which can be used by a user to program or configure the operation of the controller 150 and the compact cooling system 100. The data interface can be used by a user to input parameters or selections to configure the operation of the compact cooling system 100. A USB dongle interface can also be provided to enable the bulk transfer of large amounts of data or parameter configurations. An example embodiment can also provide a radio interface and a global positioning system (GPS) interface. The radio interface can be used by the controller 150 to establish a wireless data communication connection with a remote receiver to transfer telemetry data to the receiver including temperature or biometric data of the wearer of the cooling garment 200 in real time. The wireless data connection can also be used to transmit status data representing the real time condition of the compact cooling system 100. The radio interface can also be used by the controller 150 to wirelessly receive commands or parameters from a remote transmitter, which can be used by the controller 150 to modify the operation of the compact cooling system 100 in real time. The GPS interface can be used by the controller 150 to determine an accurate geographical location of the compact cooling system 100 or receive geographical location data in real time. The geographical location can also be reported to the remote receiver via the radio interface.

Figure 6:
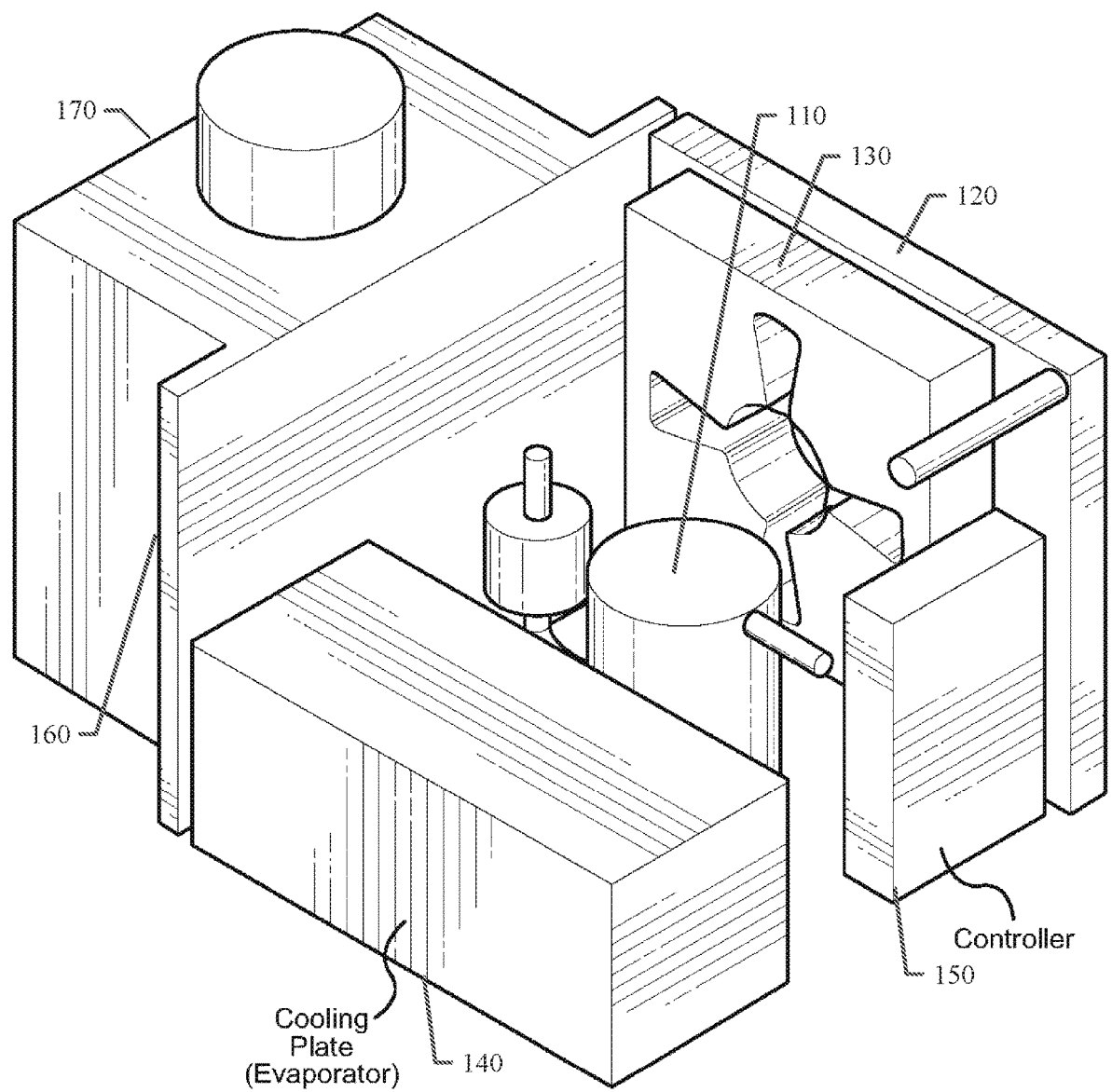
FIGS. 6 through 8 illustrate another example embodiment of the components of the compact cooling system for vehicle operators arranged in a particular form factor.
Figure 7:
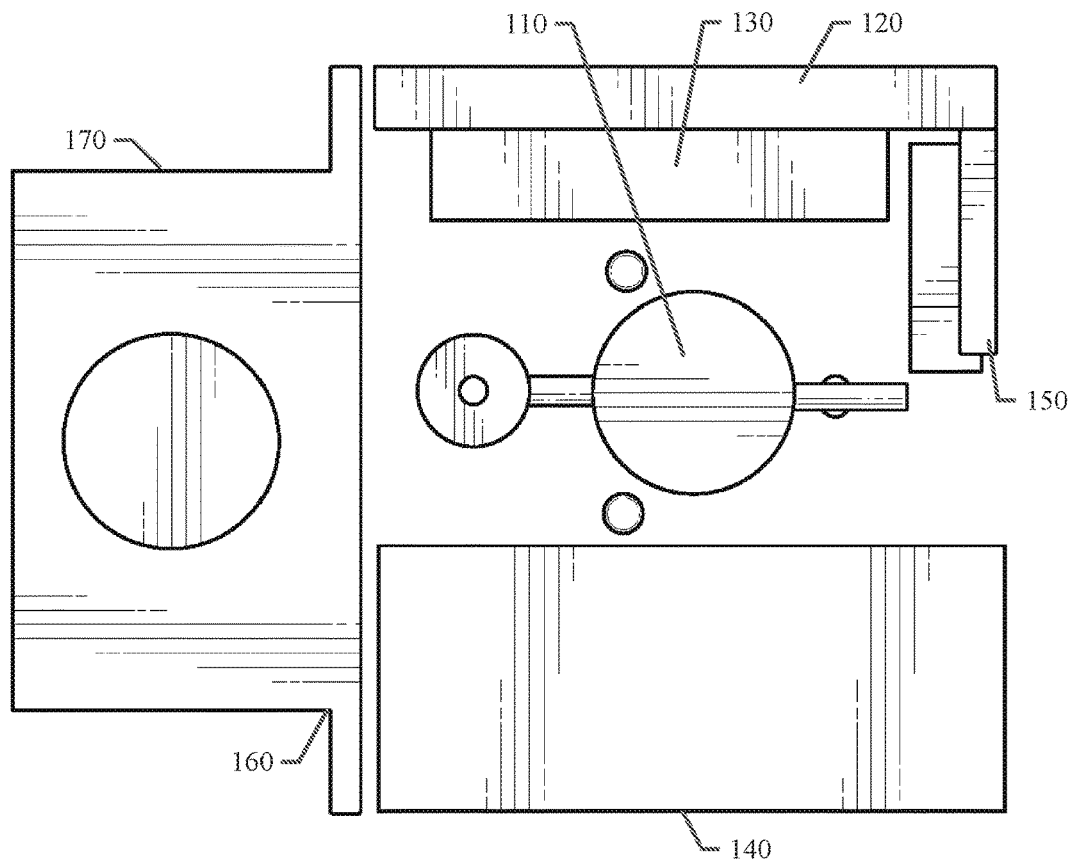
Figure 8:
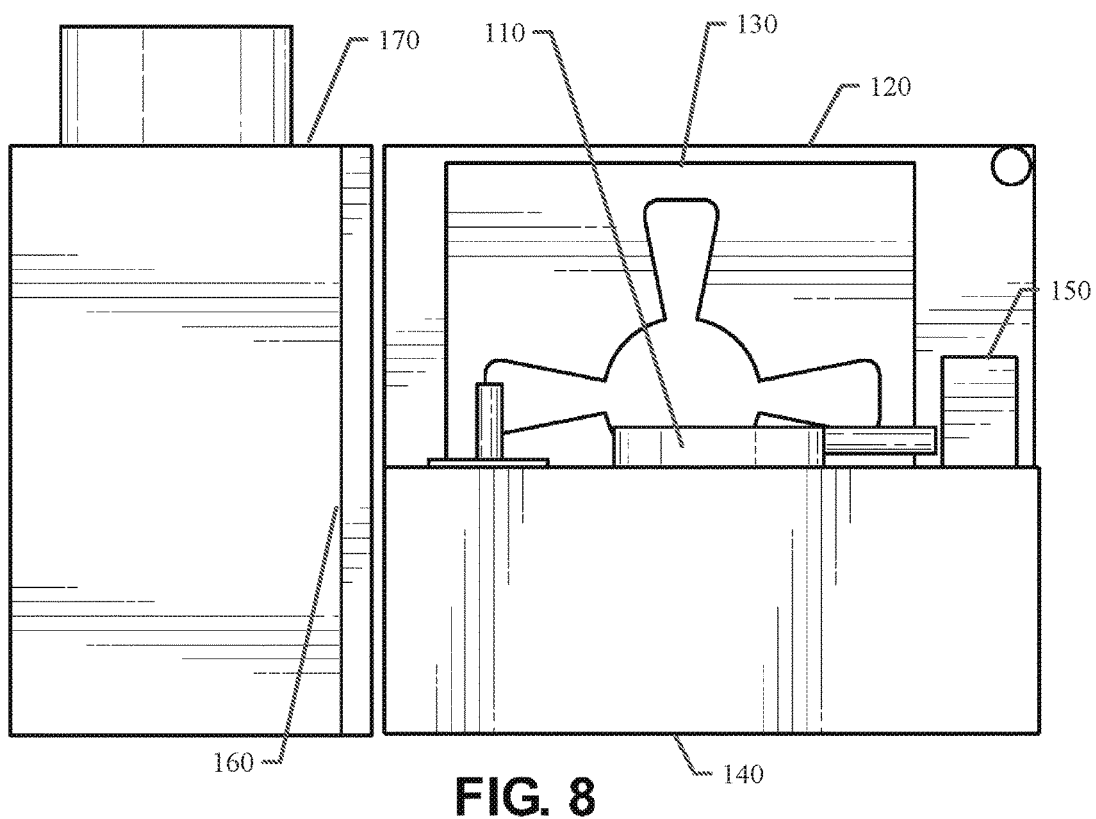
Figure 9:
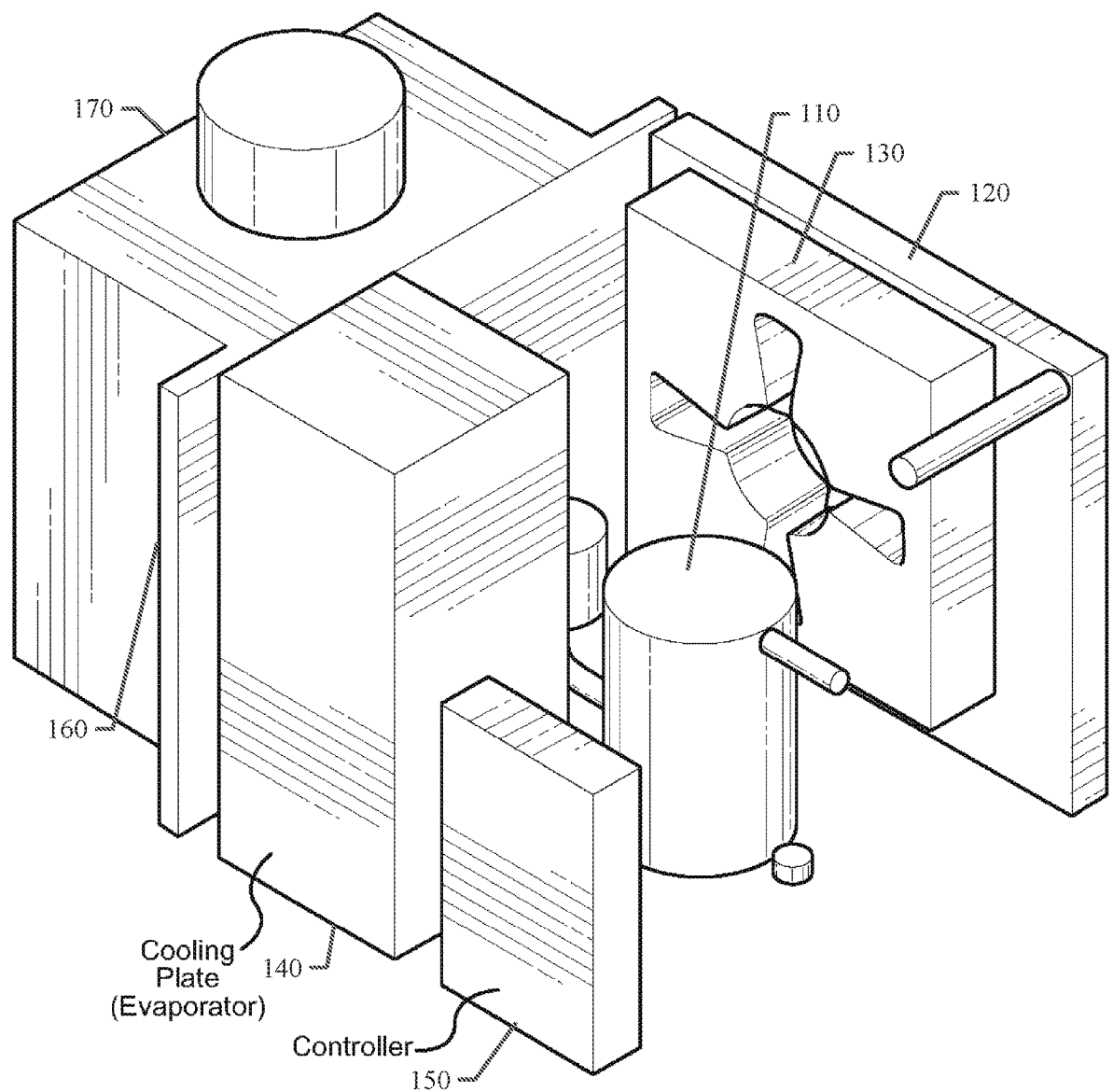
FIGS. 9 through 11 illustrate an alternative example embodiment of the components of the compact cooling system for vehicle operators arranged in another particular form factor.
Figure 10:
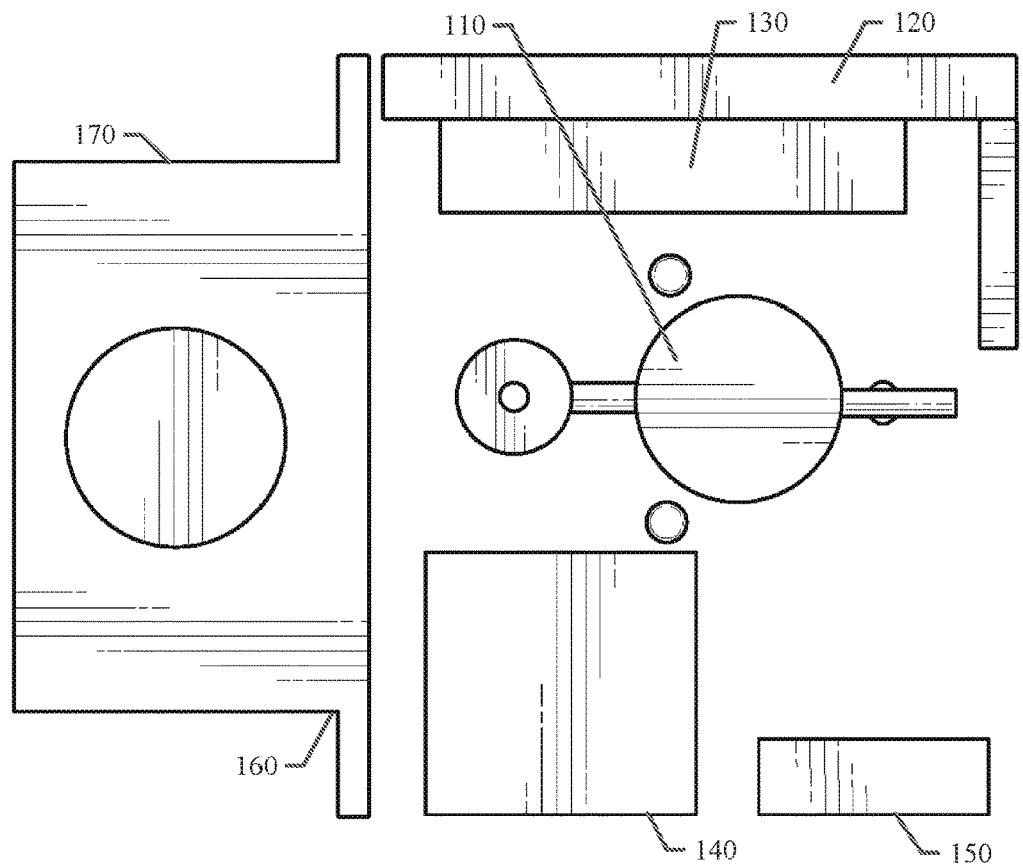
Figure 11:
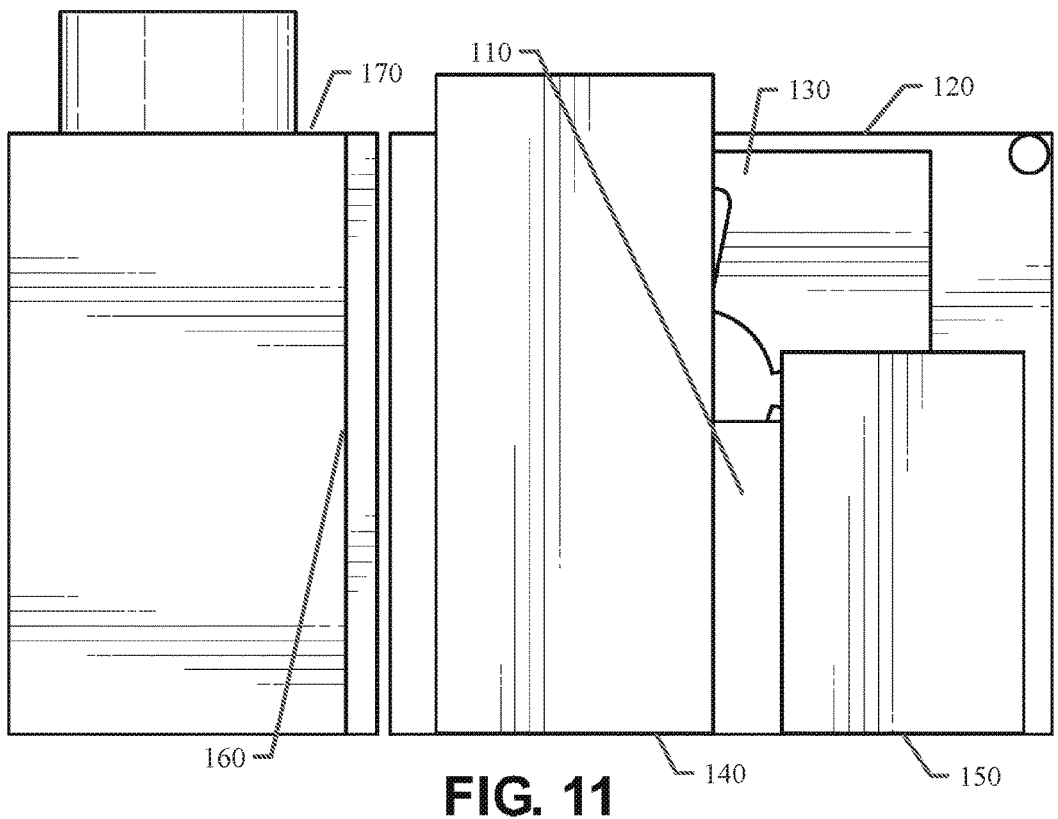

FIGS. 6 through 8 illustrate another example embodiment of the components of the compact cooling system 100 for vehicle operators arranged in a particular form factor. Because the compact cooling system 100 of the various disclosed embodiments is a highly versatile and compact system, the components of the system can be arranged in various alternative ways to optimize the system form factor being used in a particular application of the system. FIGS. 6 through 8 illustrate an example embodiment of the components of the compact cooling system 100 for vehicle operators arranged in a particular form factor. FIG. 6 is an isometric view of the form factor of the embodiment. FIG. 7 is a top view of the form factor of the embodiment. FIG. 8 is a side view of the form factor of the embodiment. FIGS. 9 through 11 illustrate an alternative example embodiment of the components of the compact cooling system 100 for vehicle operators arranged in another particular form factor. FIG. 9 is an isometric view of the form factor of the alternative embodiment. FIG. 10 is a top view of the form factor of the alternative embodiment. FIG. 11 is a side view of the form factor of the alternative embodiment. It will be apparent to those of ordinary skill in the art in view of the disclosure herein that the components of the compact cooling system 100 as disclosed and claimed can be arranged in any arbitrary manner as needed for a particular application of the technology.

FIG. 12 illustrates a flow diagram representing a sequence of operations performed in a method according to an example embodiment. In accordance with the example method 1000, the method comprises: providing a variable speed compressor (operation 1010); coupling a radiator to the compressor with a tube (operation 1020); installing a fan adjacent to the radiator (operation 1030); coupling an expansion chamber to the radiator with a tube (operation 1040); coupling a cooling plate to the expansion chamber with a tube (operation 1050); coupling a fluid reservoir to the cooling plate with a tube through which cooling fluid can be transferred (operation 1060); coupling a fluid pump to the fluid reservoir with a tube, the cooling plate including an inlet port for receiving warm cooling fluid from a cooling garment and an outlet port for transferring chilled cooling fluid to the cooling garment via the fluid reservoir and the fluid pump (operation 1070); positioning thermal sensors proximately to the inlet port and the outlet port (operation 1080); and configuring a controller in electrical connection with the compressor, the fan, and the fluid pump, the controller being configured to determine a temperature differential between the thermal sensors and to automatically control the operation of the compressor, the fan, and the fluid pump based on the temperature differential (operation 1090).

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, a compact cooling system for vehicle operators is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A compact cooling system for vehicle operators comprising:
   a variable speed compressor;
   a radiator coupled to the compressor with a tube;
   a fan adjacent to the radiator;
   an expansion chamber coupled to the radiator with a tube;
   a cooling plate coupled to the expansion chamber with a tube;
   a fluid reservoir coupled to the cooling plate with a tube through which cooling fluid can be transferred;
   a fluid pump coupled to the fluid reservoir with a tube, the cooling plate including an inlet port for receiving warm cooling fluid from a cooling garment and an outlet port for transferring chilled cooling fluid to the cooling garment via the fluid reservoir and the fluid pump;
   thermal sensors positioned proximately to the inlet port and the outlet port; and
   a controller in electrical connection with the compressor, the fan, and the fluid pump, the controller being configured to determine a temperature differential between the thermal sensors and to automatically control the operation of the compressor, the fan, and the fluid pump based on the temperature differential, the controller being further configured to include a global positioning system (GPS) interface to wirelessly receive geographical location data.

2. The compact cooling system for vehicle operators of claim 1 wherein the cooling garment includes sewn-in tubes to circulate the cooling fluid in a serpentine path across or adjacently to the body of a wearer.

3. The compact cooling system for vehicle operators of claim 1 wherein the controller being further configured to include a biometric interface to receive biometric data from a wearer of the cooling garment.

4. The compact cooling system for vehicle operators of claim 1 wherein the controller being further configured to include a radio interface to wirelessly transmit data to a remote receiver.

5. The compact cooling system for vehicle operators of claim 1 wherein the cooling fluid is of a type from the group consisting of: water, distilled water, alcohol, coolant, refrigerant, a water-based coolant, and an oil-based coolant.

6. The compact cooling system for vehicle operators of claim 1 wherein the thermal sensors are of a type from the group consisting of: standard negative Temperature Coefficient (NTC) thermistors, Resistance Temperature Detector (RTD) devices, thermocouples, and semiconductor-based sensors.

7. The compact cooling system for vehicle operators of claim 1 wherein the compact cooling system is configured in a form factor suitable for installation on a motorcycle or in a race vehicle.

8. The compact cooling system for vehicle operators of claim 1 wherein the controller being further configured to include a USB dongle interface to enable the bulk transfer of large amounts of data or parameter configurations to the controller.

9. The compact cooling system for vehicle operators of claim 1 wherein the fan is a variable speed fan.

10. A method comprising:
    providing a variable speed compressor;
    coupling a radiator to the compressor with a tube;
    installing a fan adjacent to the radiator;
    coupling an expansion chamber to the radiator with a tube;
    coupling a cooling plate to the expansion chamber with a tube;
    coupling a fluid reservoir to the cooling plate with a tube through which cooling fluid can be transferred;
    coupling a fluid pump to the fluid reservoir with a tube, the cooling plate including an inlet port for receiving warm cooling fluid from a cooling garment and an outlet port for transferring chilled cooling fluid to the cooling garment via the fluid reservoir and the fluid pump;
    positioning thermal sensors proximately to the inlet port and the outlet port; and
    configuring a controller in electrical connection with the compressor, the fan, and the fluid pump, the controller being configured to determine a temperature differential between the thermal sensors and to automatically control the operation of the compressor, the fan, and the fluid pump based on the temperature differential, the controller further including a global positioning system (GPS) interface to wirelessly receive geographical location data.

11. The method of claim 10 wherein the cooling garment includes sewn-in tubes to circulate the cooling fluid in a serpentine path across or adjacently to the body of a wearer.

12. The method of claim 10 wherein the controller includes a biometric interface to receive biometric data from a wearer of the cooling garment.

13. The method of claim 10 wherein the controller includes a radio interface to wirelessly transmit data to a remote receiver.

14. The method of claim 10 wherein the cooling fluid is of a type from the group consisting of: water, distilled water, alcohol, coolant, refrigerant, a water-based coolant, and an oil-based coolant.

15. The method of claim 10 wherein the thermal sensors are of a type from the group consisting of: standard negative Temperature Coefficient (NTC) thermistors, Resistance Temperature Detector (RTD) devices, thermocouples, and semiconductor-based sensors.

16. The method of claim 10 wherein the compact cooling system is configured in a form factor suitable for installation on a motorcycle or in a race vehicle.

17. The method of claim 10 wherein the controller includes a USB dongle interface to enable the bulk transfer of large amounts of data or parameter configurations to the controller.

18. A compact cooling system for vehicle operators comprising:
    a variable speed compressor;
    a radiator coupled to the compressor with a tube;

a fan adjacent to the radiator;

an expansion chamber coupled to the radiator with a tube;

a cooling plate coupled to the expansion chamber with a tube;

a fluid reservoir coupled to the cooling plate with a tube through which cooling fluid can be transferred;

a fluid pump coupled to the fluid reservoir with a tube, the cooling plate including an inlet port for receiving warm cooling fluid from a cooling garment and an outlet port for transferring chilled cooling fluid to the cooling garment via the fluid reservoir and the fluid pump;

thermal sensors positioned proximately to the inlet port and the outlet port; and a controller in electrical connection with the compressor, the fan, and the fluid pump, the controller being configured to determine a temperature differential between the thermal sensors and to automatically control the operation of the compressor, the fan, and the fluid pump based on the temperature differential, the controller being further configured to include a biometric interface to receive biometric data from a wearer of the cooling garment.

19. The compact cooling system for vehicle operators of claim 18 wherein the controller being further configured to include a global positioning system (GPS) interface to wirelessly receive geographical location data.

* * * * *